United States Patent
Han et al.

(10) Patent No.: US 9,332,280 B2
(45) Date of Patent: May 3, 2016

(54) IMAGE PROCESSING METHOD AND APPARATUS FOR IMPROVING DETAIL OF IMAGE

(71) Applicant: SAMSUNG ELECTRONICS CO., LTD., Suwon-si (KR)

(72) Inventors: Seong-wook Han, Seoul (KR); Hyung-jun Park, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 117 days.

(21) Appl. No.: 14/221,778

(22) Filed: Mar. 21, 2014

(65) Prior Publication Data

US 2014/0286575 A1     Sep. 25, 2014

(30) Foreign Application Priority Data

Mar. 21, 2013    (KR) ........................ 10-2013-0030574

(51) Int. Cl.
    *G06K 9/00*           (2006.01)
    *H04N 19/86*         (2014.01)
    *G06T 5/00*            (2006.01)

(52) U.S. Cl.
    CPC ................ *H04N 19/86* (2014.11); *G06T 5/003* (2013.01); *G06T 2207/20192* (2013.01)

(58) Field of Classification Search
None
See application file for complete search history.

(56) References Cited

U.S. PATENT DOCUMENTS

| | | | | |
|---|---|---|---|---|
| 5,014,333 A * | 5/1991 | Miller | .................. | H04N 1/4053 358/443 |
| 5,940,536 A * | 8/1999 | Wake | ....................... | H04N 5/14 348/E5.062 |
| 6,356,362 B1 * | 3/2002 | Ostromoukhov | .... | H04N 1/4053 358/1.9 |
| 6,867,817 B2 | 3/2005 | Bellers | | |
| 7,680,356 B2 | 3/2010 | Boyce et al. | | |
| 7,813,587 B2 * | 10/2010 | Wang | ...................... | G06T 5/004 382/275 |
| 7,957,469 B2 | 6/2011 | Boyce et al. | | |
| 7,957,605 B2 | 6/2011 | Ali | | |
| 7,974,490 B2 | 7/2011 | Lee et al. | | |
| 2009/0251736 A1 * | 10/2009 | Kawamura | ........... | H04N 1/4052 358/3.03 |

FOREIGN PATENT DOCUMENTS

| KR | 100407488 B1 | 3/2004 |
|---|---|---|
| KR | 100791388 B1 | 1/2008 |
| KR | 1020080072450 A | 8/2008 |

OTHER PUBLICATIONS

Communication dated Jul. 29, 2014 issued by Korean Intellectual Property Office in counterpart Korean application No. 10-2013-0030574.

\* cited by examiner

*Primary Examiner* — Daniel Mariam
(74) *Attorney, Agent, or Firm* — Sughrue Mion, PLLC

(57) ABSTRACT

Exemplary embodiments disclose an image processing method which includes obtaining a binary value by quantizing a value obtained by summing at least one pixel value of an input image and a quantization error value of a neighboring pixel; determining a pixel in which a detail intensity is to be inserted according to the binary value of each pixel; determining the detail intensity to be inserted in the determined pixel; and inserting the determined detail intensity in the determined pixel, wherein the quantization error value of the neighboring pixel is a difference value between an original pixel value of the neighboring pixel and a pixel value quantized with respect to a predetermined constant value.

20 Claims, 8 Drawing Sheets

IMAGE PROCESSING METHOD AND APPARATUS FOR IMPROVING DETAIL OF IMAGE

CROSS-REFERENCE TO RELATED PATENT APPLICATION

This application claims priority from Korean Patent Application No. 10-2013-0030574, filed on Mar. 21, 2013, in the Korean Intellectual Property Office, the disclosure of which is incorporated herein in its entirety by reference.

BACKGROUND

1. Field

Exemplary embodiments relate to a method and apparatus for displaying or outputting an image on a display by improving a detail of the image.

2. Description of the Related Art

When image processing, such as transmission, compression, enlargement, reduction, etc., is performed on an image, a high frequency component of the image is lost. Thus, a deterioration of the image occurs. To compensate for the high frequency component lost by image processing, a reconstruction method of modeling a reconstruction process of the image or a sharpening method of extracting the high frequency component from the image and adding the high frequency component to the image is used in the related art. However, although the two methods of the related art improve sharpness by amplifying a high frequency signal, the two methods have difficulty in expressing a detailed texture of the image. Therefore, the two methods may incur a shoot phenomenon, in which a signal on a boundary is exaggerated due to the amplified high frequency signal.

One of the related art methods adds random noise to the image so as to express the detailed texture of the deteriorated image. The related art method of adding random noise to the image may reduce block noise generated during image processing and improve the detailed texture of a flat region.

However, the related art method improves a detail of the flat region by adding the random noise to the image. The random noise may cause a great amount of low frequency signals to be added, which makes the whole image unclear, and does not improve sharpness and detail due to an addition of low frequency signals in regions other than the flat region. In fact, the random noise may reduce sharpness and detail in regions other than the flat region.

Further, one of the related art methods reduce a shoot by analyzing a luminance transient of an edge, identifying a region in which the shoot is generated and another region in which no shoot is generated, and applies different filters to the regions.

However, according to the related art method, the luminance transient of the edge is greatly influenced by directionality of the edge, and requires a great amount of calculations to include the directionality of the edge. Furthermore, the related art method cuts the shoot, which reduces a high frequency component. Thus, a detail of an image in the related art is reduced.

SUMMARY

Exemplary embodiments may provide a method and apparatus for inserting intensity of a detail into an image or reducing a shoot of the image, so as to improve a detail of the image, and display or output the image.

According to an aspect of an exemplary embodiment, there is provided an image processing method including: obtaining a binary value by quantizing a value obtained by summing at least one pixel value of an input image and a quantization error value of a neighboring pixel; determining a pixel in which a detail intensity is to be inserted according to the binary value of each pixel; determining the detail intensity to be inserted in the determined pixel; and inserting the determined detail intensity in the determined pixel, wherein the quantization error value of the neighboring pixel is a difference value between an original pixel value of the neighboring pixel and a pixel value quantized with respect to a predetermined constant value.

The determining of the detail intensity may include: extracting a high frequency component of the input image; determining whether the at least one pixel of the input image belongs to a non-flat region or a flat region by using the extracted high frequency component; and determining the detail intensity to be inserted in the determined pixel of the input image according to a result of the determination.

The determining the detail intensity may include: if the at least one pixel of the input image belongs to the non-flat region, determining the detail intensity to be inserted in the at least one pixel in proportional to the extracted high frequency component.

The determining the detail intensity may include: if the at least one pixel of the input image belongs to the flat region, determining the detail intensity to be inserted in the at least one pixel as a previously set constant value or a random constant value.

The determining the detail intensity may include: determining whether the determined detail intensity belongs to a previously set range; and if the determined detail intensity does not belong to the previously set range, determining a boundary value, that is slightly different from the determined detail intensity among boundary values of the previously set range, as the detail intensity to be inserted in the determined pixel.

According to an aspect of an exemplary embodiment, there is provided an image processing method including: obtaining a shoot intensity of at least one pixel of an input image; and diffusing the obtained shoot intensity to a neighboring pixel, wherein the shoot intensity includes at least one of a detail intensity inserted in the at least one pixel and a shoot intensity of an original pixel value of the at least one pixel.

The shoot intensity of the original pixel value of the at least one pixel may be determined according to a frequency value of the original pixel value of the at least one pixel.

The diffusing the obtained shoot intensity to the neighboring pixel may include: determining a weight to be applied to the shoot intensity in a direction of a position of the at least one pixel with respect to the neighboring pixel; applying the determined weight to the shoot intensity; and changing a neighboring pixel value using the shoot intensity un which the weight is applied.

According to a further aspect of an exemplary embodiment, a shoot reducing method including: obtaining a shoot intensity generated in each neighboring pixel of a pixel in an input image; determining a direction of at least one neighboring pixel with respect to the pixel; determining a weight to be applied to the shoot intensity generated in each neighboring pixel according to the determined direction; obtaining a total sum of the shoot intensity by applying the weight to the shoot intensity of the at least one neighboring pixel; and changing a pixel value of the pixel using the obtained total sum.

BRIEF DESCRIPTION OF THE DRAWINGS

The above and other features and advantages of the exemplary embodiments will become more apparent by describing in detail thereof with reference to the attached drawings in which.

DETAILED DESCRIPTION OF EXEMPLARY EMBODIMENTS

Figure 1:
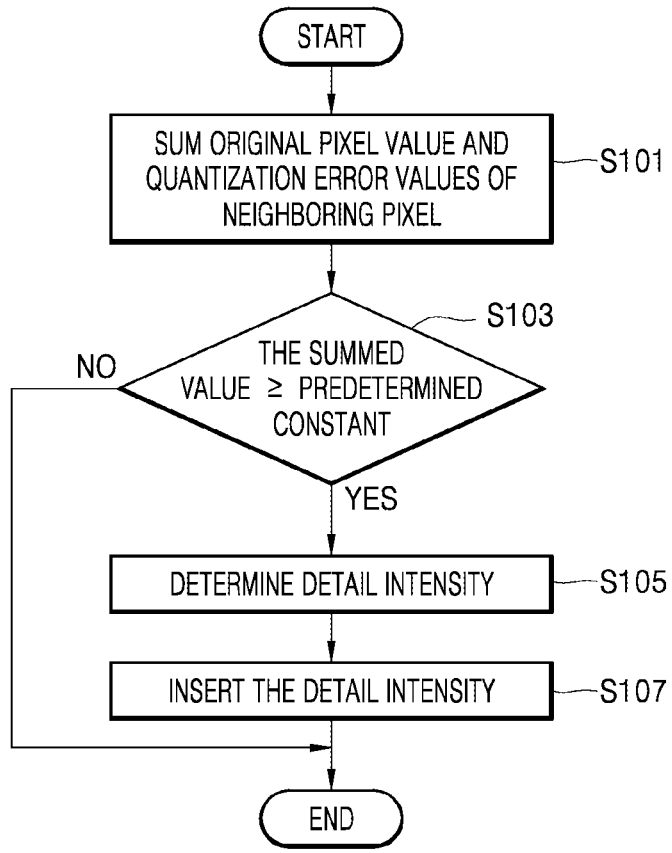
FIG. 1 is a flowchart of a method of inserting a detail intensity into an image according to an embodiment.

Exemplary embodiments will now be described more fully with reference to the accompanying drawings. In the description of the exemplary embodiments and the attached drawings, if it is determined that a detailed description of commonly-used technologies or structures related to the exemplary embodiments may unnecessarily obscure the subject matter, the detailed description will be omitted. In addition, it should be noted that like elements in the drawings are represented with like reference numerals.

The terms and the words used herein and in the claims should not be interpreted to be limited to a general or dictionary meaning, but should be interpreted to have a meaning and concept that coincide with the technical spirit of the exemplary embodiments based on the principle that the inventor can define his/her own terms for describing the exemplary embodiments. Thus, the embodiments and the drawings are just exemplary embodiments, and do not represent all technical spirits of the exemplary embodiments. Thus, it should be understood that there may be various equivalents and modification examples that may replace the embodiments at the time of filing the application.

According to an embodiment, pixel values of pixels constituting an input image may range from 0 to 255 when the input image is a single color image. Also, when the input image is an RGB image or an YCbCr image, the input image may have pixel values for each color channel. Although the input image is the single color image having pixel values from 0 to 255, the exemplary embodiments are not limited thereto. When the input image is the RGB image or the YCbCr image, the input image may be processed for each color and each channel in the same manner as processed with respect to the single color image.

FIG. 1 is a flowchart of a method of inserting detail intensity into an image according to an embodiment.

Referring to FIG. 1, in operation S101, an image processing apparatus for processing an input image according to an embodiment may obtain a binary value of each pixel by quantizing a value obtained by adding an original pixel value of at least one pixel of an input image signal and a quantization error value of a neighboring pixel with respect to a predetermined constant value. In operation S103, the image processing apparatus may determine whether to insert a detail intensity into each pixel according to the binary value of each pixel.

Operation S101, in which the binary value is obtained for each pixel by quantizing the value obtained by adding the pixel value of each pixel and the quantization error value of the neighboring pixel with respect to the predetermined constant value, is an operation of predicting and extracting a texture position having a high relevance in expressing a detail of the image. Whether to insert the detail intensity into each pixel may be determined according to the binary value of each pixel. Quantization of the value obtained by adding the pixel value of each pixel and the quantization error value of the neighboring pixel with respect to the predetermined constant value may be considered as diffusion of a quantization error generated in each pixel to the neighboring pixel in different ways. Such quantization error diffusion has a high frequency amplification function, thereby extracting a detail region of the input image. The high frequency amplification function of the quantization error diffusion will be described in more detail with reference to FIG. 2.

In operation S103, the image processing apparatus may determine a pixel into which the detail intensity is to be inserted according to a binary pixel value p. For example, the detail intensity may be inserted into a pixel having 1 as the binary pixel value p, whereas the detail intensity may not be inserted into a pixel having 0 as the binary pixel value p.

In operation S105, the image processing apparatus may determine the detail intensity to be inserted into each pixel of the input image. According to an embodiment, the detail intensity to be inserted into each pixel may be determined for each region to which each pixel belongs.

Each region to which each pixel belongs may be divided into a flat region and a non-flat region according to an extracted high frequency component. The flat region is a region that appears to be flat due to a small high frequency component. The non-flat region is a region that is indicated as an edge or detail information due to a great high frequency component. The image processing apparatus inserts the detail intensity by dividing the detail region of the image into regions in which the detail intensity is to be inserted into the flat region and the non-flat region. Therefore, the detail intensity inserted is determined in proportional to an edge intensity of the non-flat region or the high frequency component of each pixel into the non-flat image. Accordingly, an effect of more sharply displaying a texture region of the image may be obtained. Further, the detail intensity determined according to a random constant value or a previously set constant value is inserted into the flat region. Thus, the detail of the image may be improved.

In operation S107, the image processing apparatus may insert the determined detail intensity into each pixel of the input image.

For example, as shown in equation 1 below, a detail intensity G is inserted into each pixel value f of the input image. Thus, a finally output pixel value g may be determined.

$$g=f+p*G \qquad \text{[Equation 1]}$$

In other words, if p is 0, the detail intensity G may not be inserted into the pixel value f. If p is 1, the detail intensity G may be inserted into the pixel value f.

An equation relating to error diffusion method in a method of determining a pixel into which a detail intensity is to be inserted, according to an embodiment, will now be described in more detail.

Figure 2:
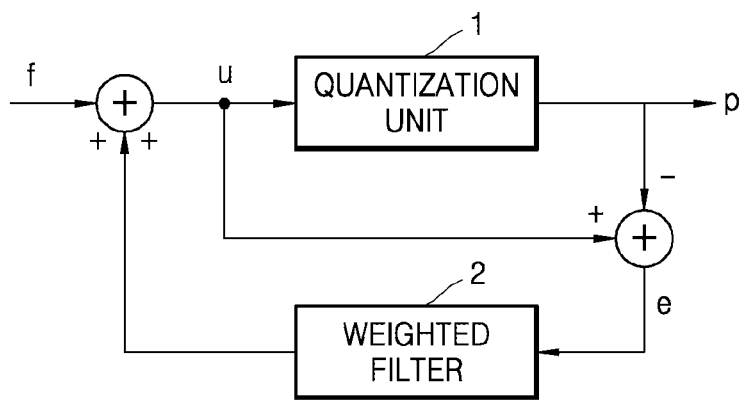
FIG. 2 is a diagram for explaining a method of determining a pixel into which a detail intensity is to be inserted according to an embodiment.

FIG. 2 is a diagram for explaining a method of determining a pixel into which a detail intensity is to be inserted according to an embodiment. The diagram of FIG. 2 may correspond to a method of binarizing an input image according to a general error diffusion.

According to an embodiment, an image processing apparatus may use error diffusion of binarizing and displaying a value obtained by adding each pixel value and a quantization error value of a neighboring pixel with respect to a predetermined constant value, so as to determine the pixel into which the detail intensity is to be inserted. A related art error diffusion method was used to convert a gray scale image into a binary image to present an image using a binary output apparatus such as a facsimile or a laser printer. A method of converting the gray scale image into the binary image is referred to as halftoning. According to halftoning, the binary output apparatus approximates a given gray scale image to a halftoning image using a low pass filter characteristic of human sight that perceives a spatial average value of a black pixel and a white pixel of a local region of a black and white image, so that the halftoning image may appear to be similar to an original image when observed from a specific distance. Halftoning includes an ordered dither method, error diffusion, and an optimization method. When the image processing apparatus processes the input image according to the error diffusion, a quantization error generated after quantizing a pixel may be filtered using a weight of an error diffusion filter. A filtering result is added to a peripheral pixel value. Thus, the original image may be renewed and an average error may become 0.

The error diffusion includes an operation of converting an input of an image into a binary value quantized using a quantization unit 1 and an operation of correcting a neighboring pixel value by spreading a quantization error to a neighboring pixel. A weight with respect to a relative position of the neighboring pixel, corrected by an error spread, may be determined by an error diffusion coefficient of the error diffusion filter.

Referring to FIG. 2, an operation of the image processing apparatus that determines whether to insert a detail intensity into a current pixel among pixels of the input image is described. A value u is determined by adding a value to which a weight W(k,l) is applied to an original pixel value f of a pixel and a quantization error value e(=u−p) of the neighboring pixel. If the quantization unit 1 quantizes the value u, a binary value p of the current pixel may be output. The binary value p of the current pixel may be used to determine whether to insert the detail intensity into the current pixel.

According to equation 2 below, the value u of the current pixel before being quantized may be obtained as a sum of the original pixel value f and a quantization error e of the neighboring pixel to which a weighted filter 2 is applied. Weighted coefficients of the weighted filter 2 are w(k,l).

$$u[m,n] = f[m,n] + \sum_k \sum_l w[k,l]e[m-k,n-l] \qquad \text{[Equation 2]}$$

In equation 2, $$\sum_k \sum_l w[k,l]e[m-k,n-l]$$

denotes a sum of values to which a weight w is applied to the quantization error e of each neighboring pixel.

In the error diffusion, the quantization error e that spreads to each neighboring pixel may be expressed as a difference value in an input value u[m,n] of the quantization unit 1, i.e., a current pixel value to which the quantization error e of each neighboring pixel spreads and a quantized value p[m,n] of the current pixel value according to equation 3 below.

$$e[m,n]=u[m,n]-p[m,n] \qquad \text{[Equation 3]}$$

Meanwhile, the quantization unit 1 may output the binarized value p by quantizing a renewed current pixel value with respect to a threshold value according to equation 4 below.

$$p[m,n] = \begin{cases} 1, & u[m,n] \geq 128 \\ 0, & \text{else} \end{cases} \qquad \text{[Equation 4]}$$

In equation 4 above, when a pixel value has a value from 0 to 255, a center value of the pixel value is exemplary set as the threshold value 128. The threshold value may not be limited to a specific value, and may be set as another value according to circumstances.

From equations 2 and 3, the quantization error e generated in each pixel during the error diffusion may be expressed as equation 5 below.

$$e(m,n) = p(m,n) - \left[f(m,n) - \sum_k \sum_l w(k,l)e(m-k,n-l)\right] \qquad \text{[Equation 5]}$$

Equation 5 may be expressed as equation 6 below if Fourier Transformation is performed on equation 5.

$$E(u,v) = \qquad \text{[Equation 6]}$$
$$P(u,v) - F(u,v) + \left[\sum_k \sum_l w(m,n)\exp(-j(uk+vl))\right]E(u,v)$$

Equation 6 may be expressed as equations 7 and 8 below.

$$P(u,v)=F(u,v)+W(u,v)E(u,v) \qquad \text{[Equation 7]}$$

Referring to equation 7, an error frequency component may be added to a frequency component F(u,v) of an original image through a filter W(u,v).

Referring to equation 8, the filter W(u,v) may be regarded as a high frequency filter that passes a high frequency component only.

$$W(u, v) = 1 - \sum_k \sum_l w(k, l)\exp(-f(uk + vl))$$ [Equation 8]

Therefore, referring to equation 8, an operation of diffusing an error of the error diffusion method may have an effect of passing a high pass filter. In other words, an output value binarized according to the error diffusion method may have a characteristic in that the quantization error that passes the high frequency filter is added to an input pixel. The output value binarized, according to the error diffusion method, depends on a characteristic of the high frequency filter. Thus, a frequency component of the binarized output value may be determined according to a characteristic of the frequency component of the error diffusion filter.

Therefore, the image processing apparatus, according to an embodiment, obtains the binary value of each pixel by quantizing the value obtained by adding the pixel value of each pixel and the quantization error value of the neighboring pixel with respect to the predetermined constant value, similar to the error diffusion method. Thus, a detail region of the input image may be discovered in a uniform pattern by quantizing a value obtained by adding a high pass filtered quantization error to each pixel value, i.e., a value obtained by adding a high frequency amplified quantization error value to each pixel.

Figure 3:
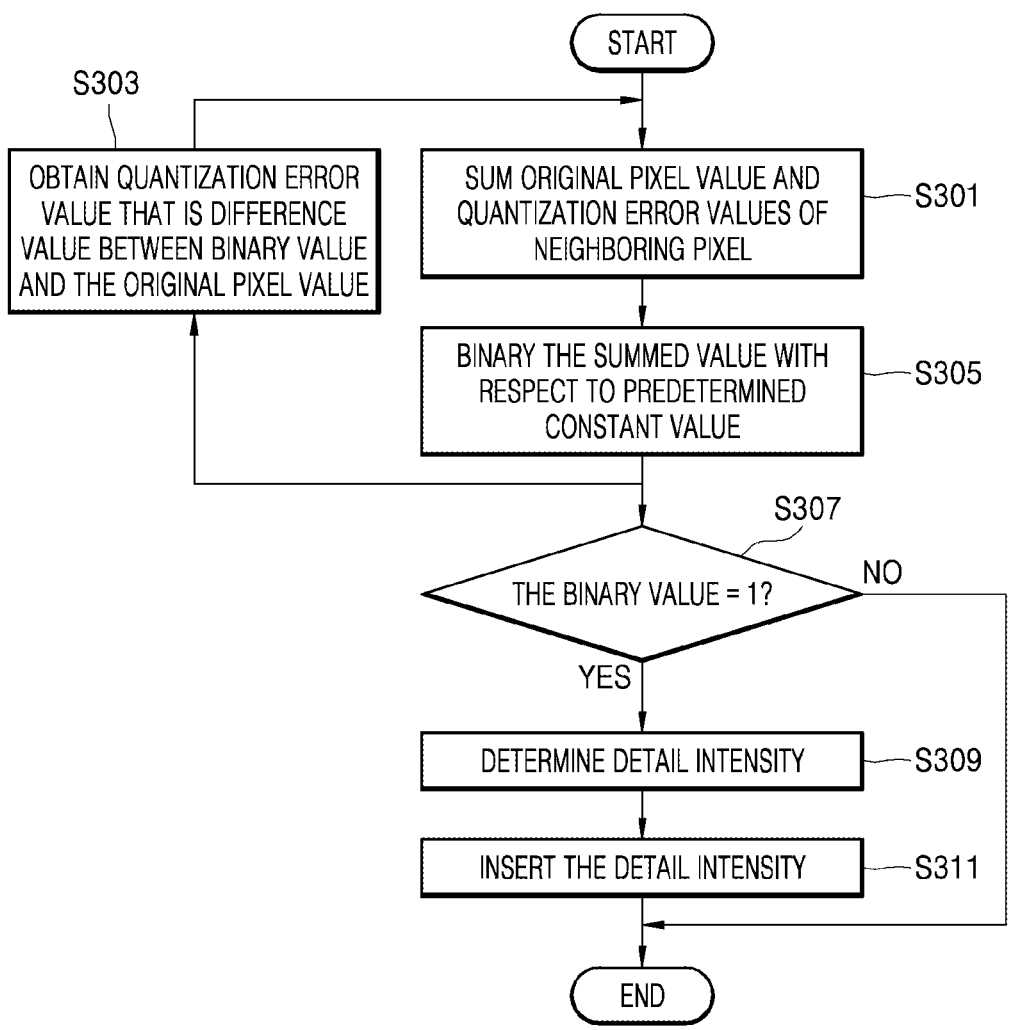
FIG. 3 is a flowchart of a method of determining a pixel into which a detail intensity is to be inserted according to an embodiment.

FIG. 3 is a flowchart of a method of determining a pixel into which a detail intensity is to be inserted according to an embodiment.

Referring to FIG. 3, in operation S301, an image processing apparatus may offset a quantization error by adding a quantization error value of each neighboring pixel to an original pixel value of a current pixel. In this regard, the image processing apparatus may add the quantization error value to which different weights are applied according to a position of each neighboring pixel with respect to the current pixel to a current pixel value.

The image processing apparatus may obtain a binary value by quantizing a value obtained by adding the quantization error value of each neighboring value to the current pixel with respect to a predetermined constant value in operation S305. For example, the predetermined constant value may be 128, which is a center value of available values of a pixel when a pixel value of an input image has a value from 0 to 255.

Meanwhile, a difference between the binary value of the current pixel and the original pixel value of the current pixel may be used to diffuse an error to each neighboring pixel in operation S303.

The image processing apparatus may determine the current pixel as the pixel into which the detail intensity is to be inserted (operations S309 and S311) according to the binary value of the current pixel in operation S307. The binary value may be set as 0 or 1, according to whether the binary value of the quantized current pixel is greater or smaller than the predetermined constant value. If the binary value is 1, the current pixel may be determined as the pixel into which the detail intensity is to be inserted. If the binary value is 0, the current pixel may not be determined as the pixel into which the detail intensity is to be inserted.

If it is determined whether to insert the detail intensity into each pixel, the image processing apparatus may determine the detail intensity to be inserted into each pixel and insert the determined detail intensity into each pixel.

Figure 4:
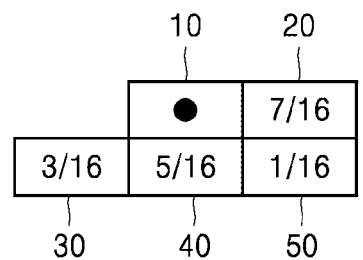
FIG. 4 is a diagram of an error diffusion filter used to diffuse a quantization error of a pixel according to an embodiment.

FIG. 4 is a diagram of an error diffusion filter used to diffuse a quantization error of a pixel according to an embodiment.

The error diffusion filter of FIG. 4 is related to a Floyd-Stenberg error diffusion, which is one of error diffusions. The error diffusion filter may include a weighted value used to diffuse the quantization error of the pixel to each neighboring pixel and information regarding an error diffusion direction. According to an embodiment, an image processing apparatus may diffuse the quantization error of the pixel to each neighboring pixel using the error diffusion filter. However, the error diffusion filter relating to Floyd-Stenberg error diffusion is merely an example. The exemplary embodiments are not limited thereto, and another filter may be used.

Referring to FIG. 4, an error may be diffused to neighboring pixels 20, 30, 40, and 50 with respect to a quantization error value of a pixel 10 by applying a weight identical to a diffusion direction among weights 7/16, 3/16, 5/16, and 1/16. In other words, the quantization error value to which the weight is applied may be added to an original pixel value of the neighboring pixel.

For example, when the quantization error value of the current pixel 10 is a, α value that is to be added to the neighboring pixel 20 as the quantization error value of the current pixel 10 may be 7α/16. Further, a value that is to be added to the neighboring pixel 30 as the quantization error value of the current pixel 10 may be 3α/16.

Figure 5:
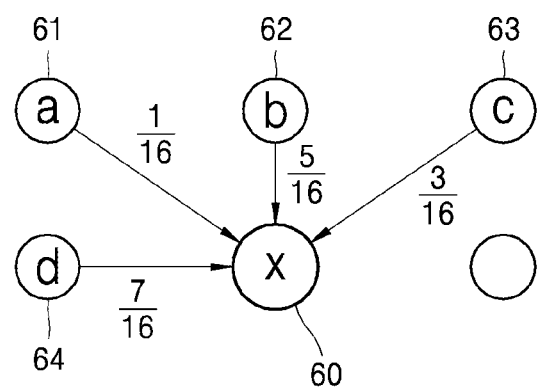
FIG. 5 is a diagram for explaining a method of diffusing a quantization error value of each neighboring pixel to a current pixel according to an embodiment.

FIG. 5 is a diagram for explaining a method of diffusing quantization error values a, b, c, and d of neighboring pixels 61, 62, 63, and 64 to a current pixel 60 according to an embodiment.

FIG. 4 shows an error diffusion filter indicating a weight applied to a quantization error value of a current pixel. FIG. 5 shows the current pixel 60 to which the quantization error values a, b, c, and d of the neighboring pixels 61, 62, 63, and 64 diffuses.

Referring to FIG. 5, when a pixel value of the current pixel 60 is x, and the quantization error values a, b, c, and d are generated in the neighboring pixels 61, 62, 63, and 64, 1a/16, 5b/16, 3c/16, and 7d/16 obtained by applying weights to the quantization error values a, b, c, and d may be added to the pixel value x of the current pixel 60. Thus, the pixel value x of the current pixel 60 may be x+1a/16+5b/16+3c/16+7d/16, in which the quantization error values a, b, c, and d of the neighboring pixels 61, 62, 63, and 64 are added, and may be quantized by the quantization unit 1.

According to an embodiment, the weights of the error diffusion filter and the error diffusion direction are merely examples. Thus, exemplary embodiments are not limited thereto.

Figure 6:
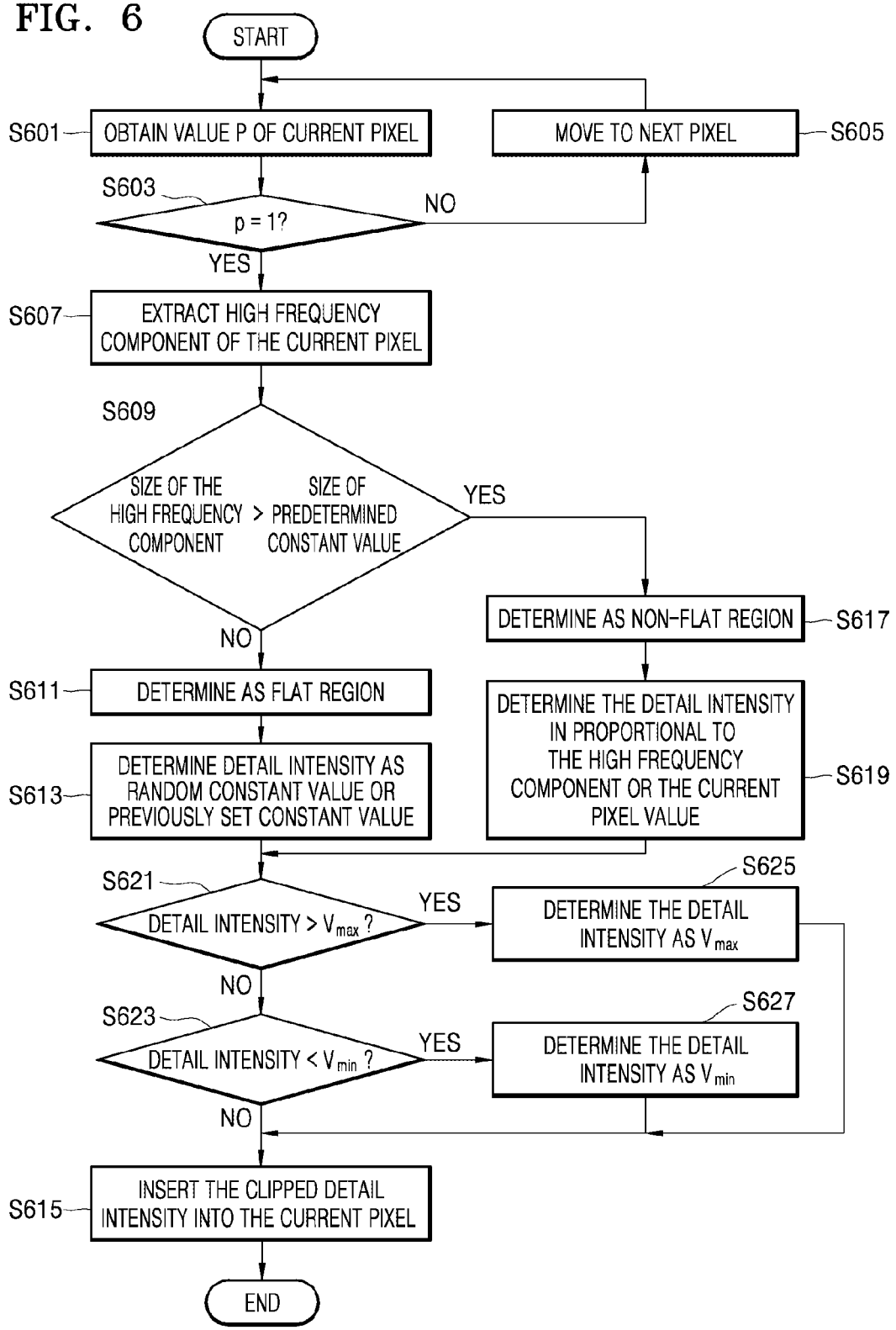
FIG. 6 is a flowchart of a method of determining a detail intensity that is to be inserted into a pixel according to an embodiment.

FIG. 6 is a flowchart of a method of determining a detail intensity that is to be inserted into a pixel according to an embodiment.

Referring to FIG. 6, it may be determined whether to insert the detail intensity with respect to a current pixel according to a value p of the current pixel. The value p may be used to determine whether to insert the detail intensity into the current pixel. An image processing apparatus may determine whether to insert the detail intensity into the current pixel according to the value p of the current pixel. The value p of each pixel may be obtained by quantizing a value obtained by adding a quantization error value of at least one neighboring pixel and an original pixel value. The quantization error value to which a weight is applied according to a position of the neighboring pixel with respect to the current pixel may be added to the original pixel value.

In operation S601, the image processing apparatus may obtain the value p of the current pixel and determine the detail intensity that is to be inserted into the current pixel when the value p is 1 in operation S603. Meanwhile, when the value p is other than 1, i.e. 0, the image processing apparatus may move to another pixel and determine a detail intensity that is to be inserted into another pixel.

According to an embodiment, although the image processing apparatus may determine the detail intensity according to the value p of the current pixel in operations S601 through S603, the image processing apparatus according to another embodiment may not determine the detail intensity of each pixel using the value p and may determine the detail intensity of each pixel when the detail intensity is inserted into each pixel. In other words, the image processing apparatus may first determine the detail intensity that is to be inserted into each pixel and when the determined detail intensity is inserted into each pixel, determine whether to insert the determined detail intensity into each pixel according to the value p indicating whether to insert the determined detail intensity into each pixel.

In operation S607, the image processing apparatus may extract a high frequency component of each pixel to determine whether each pixel belongs to a non-flat region or a flat region. There are various methods of extracting the high frequency component of each pixel. For example, the high frequency component may be extracted by subtracting a low frequency component LPF(f(m,n)) from a pixel value according to equation 9 below. In equation 9, $f_{HPF}$(m,n) denotes the high frequency component of a pixel having a position (m,n).

$$f_{HPF}(m,n)=f[m,n]-LPF(f(m,n))\qquad\text{[Equation 9]}$$

In operation S609, the image processing apparatus may identify each pixel as the flat region and the non-flat region by comparing the extracted high frequency component of each pixel and a previously set constant value.

For example, if a size of the extracted high frequency component of a pixel is greater than 1, the pixel may be determined as the non-flat region. If the size of the extracted high frequency component is smaller than or equal to 1, the pixel may be determined as the flat region. If the size of the extracted high frequency component is greater than 1, the pixel may be determined as the non-flat region, since a pixel value has a great variation. The previously set constant value is merely exemplary as 1. According to another case, the previously set constant value may be a value other than 1.

When the image processing apparatus determines that the current pixel is the flat region in operation S611, in operation S613, the image processing apparatus may determine a random constant value or the previously set constant value as the detail intensity that is to be inserted into the current pixel.

When the image processing apparatus determines that the current pixel is the non-flat region in operation S617, in operation S619, the image processing apparatus may determine a value determined in proportional to at least one of the high frequency component of the current pixel and the original pixel value as the detail intensity that is to be inserted into the current pixel.

The detail intensity, which is to be inserted into the current pixel in operations S613 through S619, may be expressed according to equation 10 below.

$$s[m,n]=\begin{cases}f_{HFP}[m,n]\cdot(255-f),\text{ if }|f_{HPF}[m,n]|>1\\ \qquad\text{(in case of t}\square\text{e non-flat region)}\\ \text{Uniform}(-10,10),\text{else(in case of the flat region)}\end{cases}\quad\text{[Equation 10]}$$

In equation 10 above, the detail intensity may be determined in the non-flat region from a multiplication of the high frequency component and a current pixel value, and in the flat region from a uniform function having a constant value as the previously set constant value.

In an equation of calculating the detail intensity of the non-flat region in equation 10, the brighter a value f indicating the pixel value is, the smaller the value the detail intensity has. The detail intensity may be determined to have a greater value when the pixel value is darker. This is to display a detail part of an input image to be better perceived by determining the detail intensity according to the pixel value. It is difficult for a person to perceive a high frequency component in a dark part of a normal image, whereas it is easy for the person to perceive the high frequency component in a bright part of the normal image. Thus, the darker the pixel value is, the greater value of the detail intensity may be inserted. Further, the brighter the pixel value is, the smaller value of the detail intensity may be inserted.

When the current pixel value belongs to the flat region, since the high frequency component is smaller than 1, it is inappropriate to determine the detail intensity in proportional to the high frequency component. Instead, a random value or a previously set constant value may be determined as the detail intensity.

Equation 10 is merely exemplary, and exemplary embodiments are not limited thereto.

It may be determined whether a detail intensity value determined in operation S613 or S619 belongs to a previously set range. If a very great or small detail intensity value is inserted into an image, since the image may be unnatural, the image processing apparatus may correct the detail intensity value to belong to the previously set range.

This may be expressed according to equation 11 below. The detail intensity value determined in operation S613 or S619 in equation 11 is s[m,n]. G denotes a value obtained by clipping s within a set range.

$$G=\begin{cases}V_{max},&\text{if }s[m,n]>V_{max}\\ V_{min},&\text{else if }s[m,n]<V_{min}\\ s[m,n],&\text{else}\end{cases}\quad\text{[Equation 11]}$$

In operation S621, when the detail intensity value is greater than a previously set maximum value $V_{max}$, the image processing apparatus sets the detail intensity value as $V_{max}$ in operation S625. In operation S623, when the detail intensity value is greater than a previously set minimum value $V_{min}$, the image processing apparatus sets the detail intensity value as $V_{min}$ in operation S627. Thus, G may have one of three values $V_{max}$, $V_{min}$, and s[m,n] according to equation 11.

In operation S615, the image processing apparatus may insert G, which is the detail intensity obtained by clipping the determined detail intensity into the current pixel. The detail intensity value may be inserted into the current pixel by adding the detail intensity value into the current pixel value.

The inserting of detail intensity value may be expressed according to equation 12 below.

$$g[m,n]=f[m,n]+p[m,n]\cdot G \quad \text{[Equation 12]}$$

According to equation 12 above, the detail intensity may be inserted into the current pixel by adding G and f only when p indicates that the detail intensity is 1.

Meanwhile, when p is 0, the detail intensity is not inserted into the current pixel.

Figure 7:
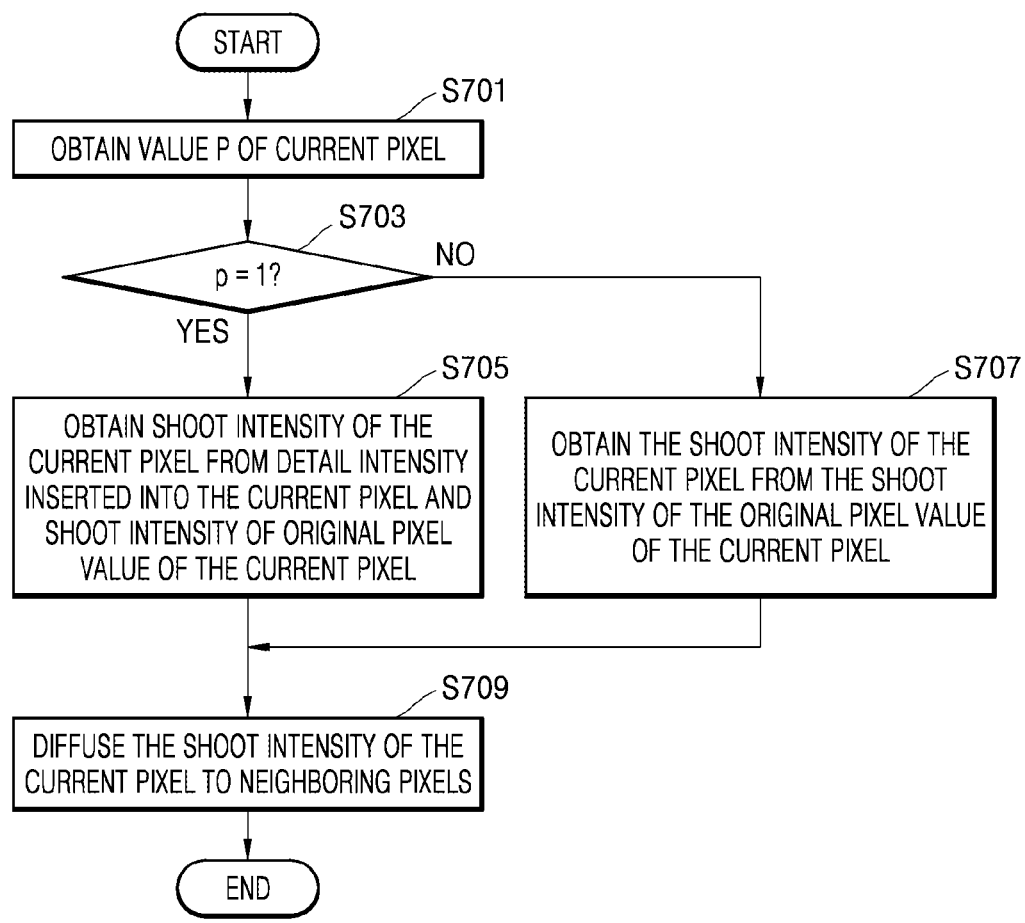
FIG. 7 is a flowchart of a method of diffusing a shoot intensity of a current pixel to neighboring pixel according to an embodiment.

FIG. 7 is a flowchart of a method of diffusing a shoot intensity of a current pixel to a neighboring pixel according to an embodiment.

According to an embodiment, a shoot may be generated in an image when a high frequency component is excessively amplified during image processing. In particular, if a detail intensity is inserted to improve a detail of the image, the high frequency component is amplified so that the shoot may be generated in the image. An unnatural white point or line is added to a boundary of the image in which the shoot is generated. Thus, the shoot may be removed.

Referring to FIG. 7, in operation S701, an image processing apparatus may obtain a value p indicating whether to insert a detail intensity of the current pixel. The shoot intensity of the current pixel may be determined according to the value p.

When p is 1, since the current pixel is a pixel in which the detail intensity is inserted, in operation S705, the image processing apparatus may determine the shoot intensity of the current pixel in consideration of both a shoot intensity of an original pixel and the detail intensity inserted into the current pixel. In this regard, the shoot intensity of the original pixel may be a high frequency component of the original pixel. Thus, the shoot intensity of the current pixel determined in operation S705 may be a sum of the high frequency component of the original pixel and the detail intensity inserted into the current pixel.

When p is 0, since the detail intensity is not inserted, in operation S707, the image processing apparatus may determine the shoot intensity of the current pixel in consideration of the shoot intensity of the original pixel of the current pixel. In this regard, the shoot intensity of the current pixel may be the high frequency component of the original pixel. Thus, the shoot intensity of the current pixel may be determined as the shoot intensity of the original pixel.

In operation S709, a shoot intensity generated in an input image may be reduced by diffusing the determined shoot intensity of the current pixel to the neighboring pixel. In other words, if the shoot intensity of the current pixel is a positive number value, the shoot intensity generated in the input image may be reduced by diffusing a negative number value having the same magnitude as the positive number value to the neighboring pixel. If the shoot intensity generated in the input image is +5, the shoot intensity diffused to the neighboring pixel of the current pixel may be −5.

According to an embodiment, a problem of the related art in which a detail of an image is reduced due to a reduction in the high frequency component of the current pixel or a large amount of calculations required according to an edge directionality may be overcome by diffusing the shoot intensity of the current pixel to the neighboring pixel without a change in a current pixel value.

Figure 8:
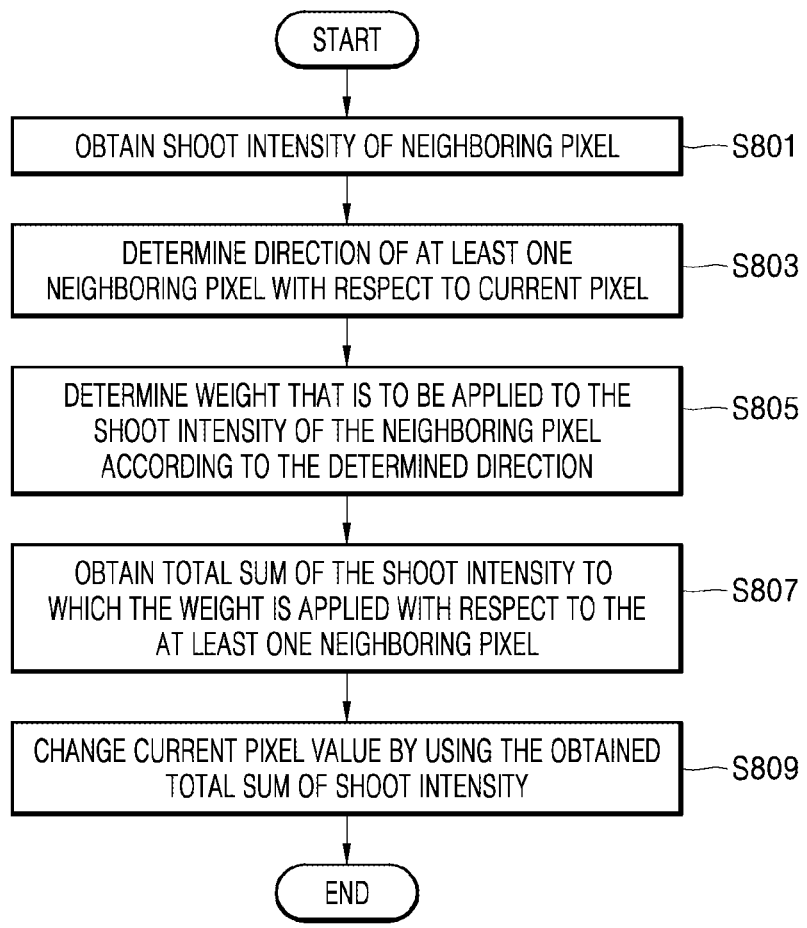
FIG. 8 is a flowchart of a method of reducing a shoot generated in an image by changing a current pixel value using a shoot intensity of each neighboring pixel according to an embodiment.

FIG. 8 is a flowchart of a method of reducing a shoot generated in an image by changing a current pixel value using a shoot intensity of each neighboring pixel according to an embodiment. FIG. 7 shows a method of determining a shoot intensity generated in a current pixel. FIG. 8 shows a method of reducing a shoot with respect to a current pixel to which a shoot intensity generated in each neighboring pixel is diffused.

Referring to FIG. 8, in operation S801, an image processing apparatus obtains the shoot intensity generated in each neighboring pixel. If a shoot intensity generated in a pixel is +5, a shoot intensity diffused to neighboring pixel may be −5.

In operations S803 and S805, a weight that is to be applied to the shoot intensity may be determined according to a relative position of each neighboring pixel with respect to the current pixel. In operation S807, the image processing apparatus obtains a sum of values obtained by applying the weight to the shoot intensity of at least one neighboring pixel. In operation S809, the image processing apparatus may reduce the shoot with respect to the current pixel by adding the sum obtained in operation S807 to the current pixel value.

Adding the sum of values obtained by applying the weight to the shoot intensity of at least one neighboring pixel to the current pixel may be the same as adding values obtained by applying a weight to a quantization error value generated in each neighboring pixel described with reference to FIGS. 3 and 4.

In other words, the error diffusion filter described with reference to FIG. 3 may be used to diffuse the shoot intensity generated in each neighboring pixel to the current pixel as described with reference to FIG. 4.

In particular, with reference to FIG. 3, when a shoot intensity of the current pixel 10 is α, a value that is to be added to the neighboring pixel 20 as the shoot intensity of the current pixel 10 may be 7α/16. Further, a value that is to be added to the neighboring pixel 30 as the shoot intensity of the current pixel 10 may be 3α/16. In other words, in the same manner as a quantization error value is diffused to each neighboring pixel, the shoot generated in the current pixel may be diffused to each neighboring pixel.

In particular, with reference to FIG. 4, when a pixel value of the current pixel 60 is x, and shoot intensity values a, b, c, and d are generated in the neighboring pixels 61, 62, 63, and 64 as 1a/16, 5b/16, 3c/16, and 7d/16, the shoot intensity values a, b, c, and d may be added to the pixel value x of the current pixel 60. Thus, the pixel value x of the current pixel 60 may be x+1a/16+5b/16+3c/16+7d/16, in which the shoot intensity values a, b, c, and d of the neighboring pixels 61, 62, 63, and 64 are diffused according to an embodiment.

In the same manner as the shoot intensity is diffused, the weights and diffusion direction of FIGS. 3 and 4 are merely exemplary. However, the exemplary embodiments are not limited thereto.

Figure 9:
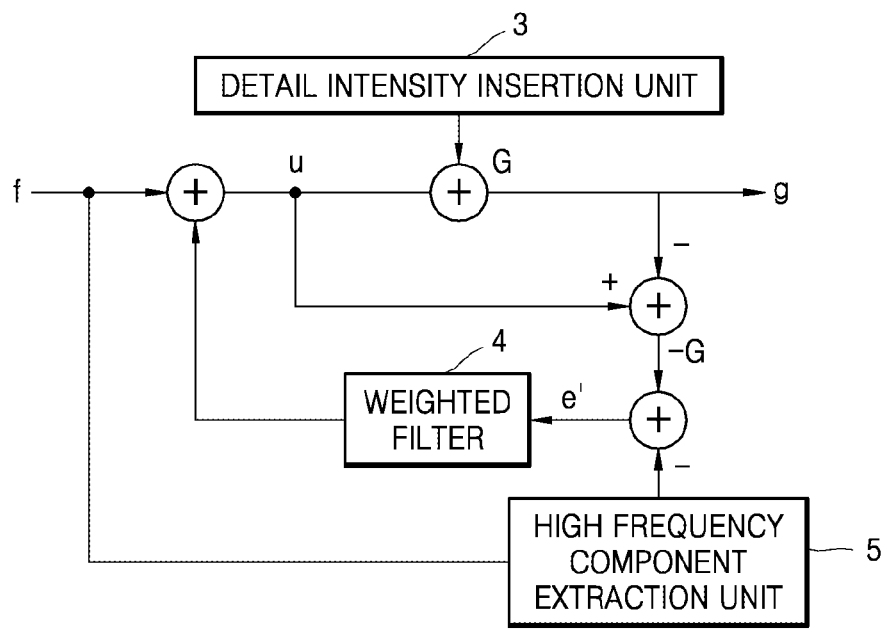
FIG. 9 is a flowchart of a method of reducing a shoot generated in an image by changing a current pixel value using a shoot intensity of each neighboring pixel according to another embodiment.

FIG. 9 is a flowchart of a method of reducing a shoot generated in an image by changing a current pixel value using a shoot intensity of each neighboring pixel according to another embodiment.

Referring to FIG. 9, u is a value obtained by adding a value obtained by applying a weight W(k,l) to a shoot intensity value e' of a neighboring pixel to an original pixel value f of a pixel. A final pixel value g may be output by inserting the detail intensity G which is an output value of a detail intensity insertion unit 3 into the value u. The detail intensity G may be a detail intensity value that may be inserted into the current pixel. The detail intensity G may indicate a high frequency component of the pixel.

The value u and the final pixel value g may be expressed according to equations 13 and 14.

$$u[m, n] = f[m, n] + \sum_k \sum_l w[k, l]e'[m-k, n-l] \quad \text{[Equation 13]}$$

$$g[m, n] = u[m, n] + G, \; G = HPF1(f[m, n]) \quad \text{[Equation 14]}$$

The shoot intensity value e' of the neighboring pixel may be a negative number value of a value obtained by adding the detail intensity G and a shoot intensity of an original pixel of the current pixel. The shoot intensity value e' may be expressed according to equation 15 below. The shoot intensity generated in the original pixel may be a high frequency component of the original pixel.

$$e'[m,n] = -G - HPF_2(f[m,n]) \quad \text{[Equation 15]}$$

In equation 15 above, $HPF_2(f[m,n])$ is the high frequency component of the original pixel.

Figure 10:
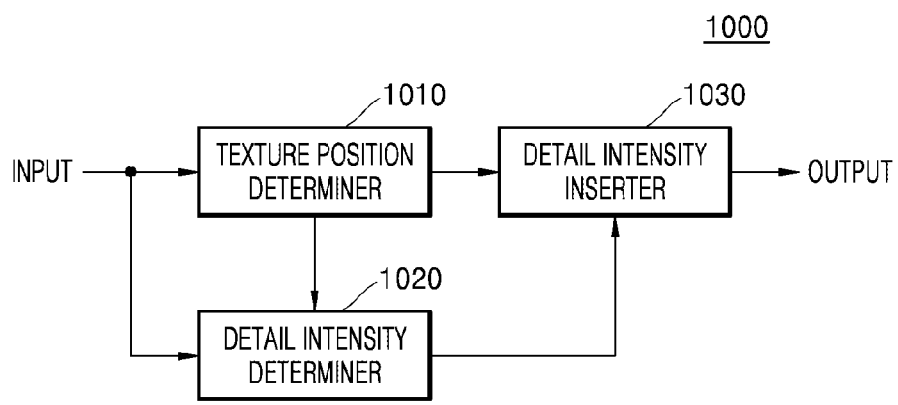
FIG. 10 is a block diagram of an image processing apparatus for inserting a detail intensity into an image according to an embodiment.

FIG. 10 is a block diagram of an image processing apparatus 1000 for inserting a detail intensity into an image according to an embodiment.

Referring to FIG. 10, the image processing apparatus 1000 for inserting the detail intensity into the image may include a texture position determiner 1010, a detail intensity determiner 1020, and a detail intensity inserter unit 1030.

The texture position determiner 1010 may obtain a binary value of each pixel by quantizing a value obtained by adding an original pixel value of at least one pixel of an input image signal and a quantization error value of a neighboring pixel with respect to a predetermined constant value. The texture position determiner 1010 may determine whether to insert the detail intensity into each pixel according to the binary value of each pixel.

The binary value of each pixel may be, for example, 0 or 1. Thus, the detail intensity may be inserted into each pixel if the binary value of each pixel is 0, and the detail intensity may not be inserted into each pixel if the binary value of each pixel is 1.

The detail intensity determiner 1020 may determine the detail intensity that is to be inserted into each pixel of the input image. The detail intensity that is to be inserted into each pixel may be determined differently according to a region to which each pixel belongs. The region to which each pixel belongs may be divided into a flat region and a non-flat region according to a high frequency component extracted from each pixel.

When the detail intensity determiner 1020 determines that the current pixel is the flat region, the detail intensity determiner 1020 may determine a random constant value or the previously set constant value as the detail intensity that is to be inserted into the current pixel. When the detail intensity determiner 1020 determines that the current pixel is the non-flat region, the detail intensity determiner 1020 may determine a value determined in proportional to at least one of the high frequency component of the current pixel and the original pixel value as the detail intensity that is to be inserted into the current pixel.

The detail intensity determiner 1020 may determine whether the determined detail intensity belongs to a previously set range and correct the detail intensity to belong to the previously set range. If a very great or small detail intensity value is inserted into an image, since the image may be unnatural, the detail intensity determiner 1020 may correct the detail intensity value to belong to the previously set range.

The detail intensity inserter 1030 may insert the detail intensity determined by the detail intensity determiner 1020 into a pixel that is determined by the texture position determiner 1010 to insert the detail intensity. The detail intensity inserter 1030 inserts the detail intensity into an input image.

Thus, the image processing apparatus 1000 may output an input image having improved texture. The image processing apparatus 1000 of FIG. 10 may perform the method of inserting the detail intensity into the image according to an embodiment of FIG. 1.

Figure 11:
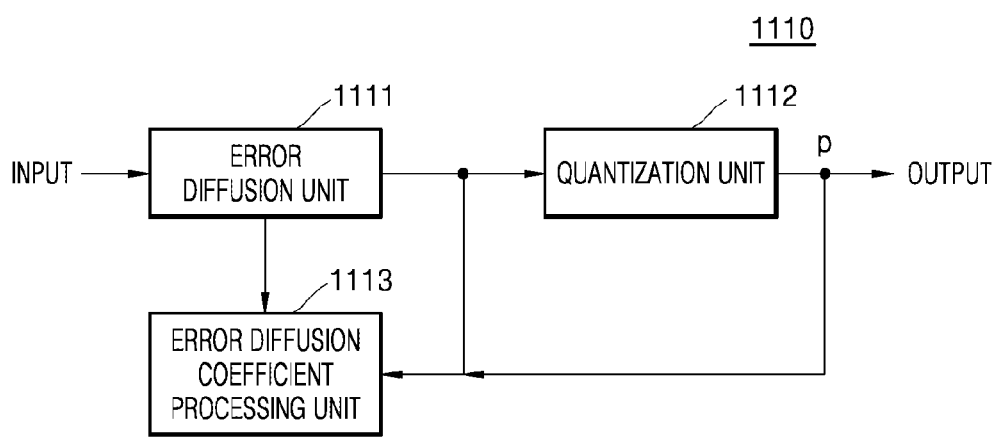
FIG. 11 is a block diagram of a texture position determining unit for determining a pixel into which a detail intensity is to be inserted according to an embodiment.

FIG. 11 is a block diagram of a texture position determining unit 1110 for determining a pixel into which a detail intensity is to be inserted according to an embodiment.

Referring to FIG. 11, the texture position determining unit 1110 may include an error diffusion unit 1111, a quantization unit 1112, and an error diffusion coefficient processing unit 1113. The texture position determining unit 1110 of FIG. 11 corresponds to the texture position determining unit 1010 of FIG. 10. Thus, a redundant description thereof is omitted.

The error diffusion unit 1111 may offset a quantization error by adding a quantization error value of each neighboring pixel to an original pixel value of a current pixel. In this regard, the error diffusion unit 1111 may add the quantization error value to which different weights are applied according to a position of each neighboring pixel with respect to the current pixel to a current pixel value.

The quantization unit 1112 may quantize the current pixel value to which the quantization error value of each neighboring pixel is diffused by the error diffusion unit 1111. The quantization unit 1112 may output a binary value by quantizing the current pixel value output from the error diffusion unit 1111 with respect to a predetermined constant value. The binary value may be used to determine whether to insert the detail intensity according to an embodiment into the current pixel.

The error diffusion coefficient processing unit 1113 may transfer a value obtained by summing quantization error values of neighboring pixel to which weights are applied to the error diffusion unit 1111. The error diffusion coefficient processing unit 1113 may obtain and provide a quantization error value of each pixel to the error diffusion unit 1111 as the quantization error value of each neighboring pixel with respect to the current pixel. The quantization error value of each pixel is a difference between a quantized pixel value and an original pixel value. The texture position determining unit 1110 of FIG. 11 may perform the method of determining the pixel into which the detail intensity is to be inserted according to an embodiment of FIG. 2.

Figure 12:
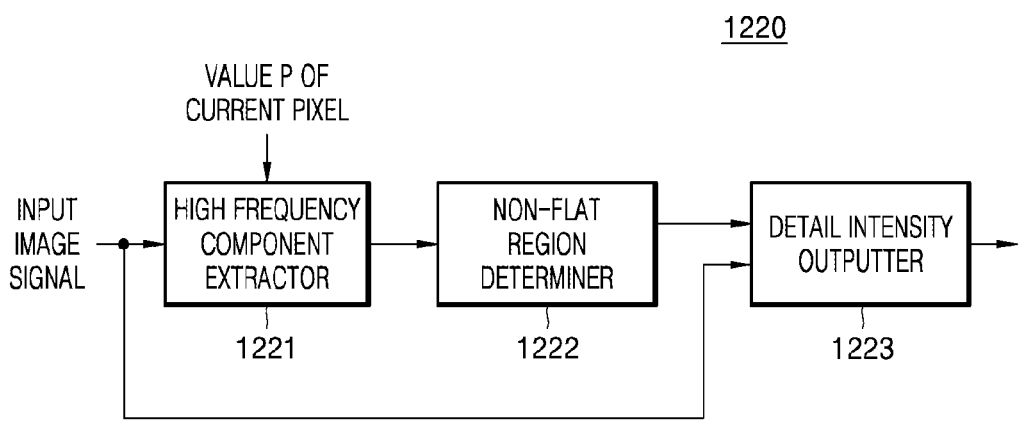
FIG. 12 is a block diagram of a detail intensity determining unit for determining a detail intensity that is to be inserted into a pixel according to an embodiment.

FIG. 12 is a block diagram of a detail intensity determiner 1220 for determining a detail intensity that is to be inserted into a pixel according to an embodiment.

Referring to FIG. 12, the detail intensity determiner 1220 may include a high frequency component extractor 1221, a non-flat region determiner 1222, and a detail intensity outputter 1223. The detail intensity determiner 1220 of FIG. 12 corresponds to the detail intensity determiner 1020 of FIG. 10. Thus, a redundant description thereof is omitted.

The high frequency component extractor 1221 may extract a high frequency component with respect to each pixel of an input image. In this regard, the high frequency component extractor 1221 may receive a value p of a current pixel from a texture position determiner 1010, extracts a high frequency component with respect to the pixel determined to insert the detail intensity, and determine the detail intensity only with respect to the pixel determined to insert the detail intensity.

The non-flat region determiner 1222 may determine whether each pixel belongs to a non-flat region or a flat region using the high frequency component of each pixel extracted by the high frequency component extractor 1221. The non-flat region determiner 1222 may determine that the pixel belongs to the non-flat region if the extracted high frequency component is greater than 1. However, such determination may be based on a value other than 1 according to another exemplary embodiment.

The detail intensity outputter 1223 may output the detail intensity that is to be inserted into each pixel according to whether each pixel belongs to the non-flat region or the flat region.

The detail intensity of a pixel that belongs to the non-flat region may be determined as a multiplication of the high frequency component and an original pixel value. Since the detail intensity of a pixel that belongs to the flat region has the high frequency component smaller than 1, the detail intensity is not determined in proportional to the high frequency component. However, the detail intensity may be determined as a random number or a previously set constant value.

However, the detail intensity of a pixel that belongs to the non-flat region may be determined and output as a maximum value or a minimum value if the detail intensity does not belong to a predetermined range.

The detail intensity outputter 1223 of FIG. 12 may perform the method of determining the detail intensity that is to be inserted into the pixel according to an embodiment of FIG. 6.

Figure 13:
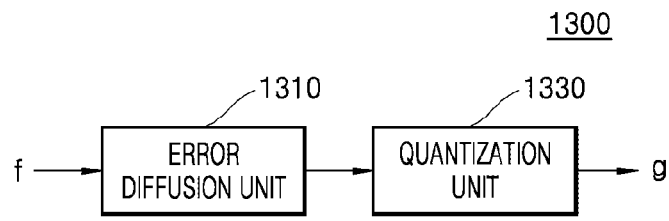
FIGS. 13 and 14 are block diagrams of an image processing apparatus for reducing a shoot generated in an image according to an embodiment.
Figure 14:
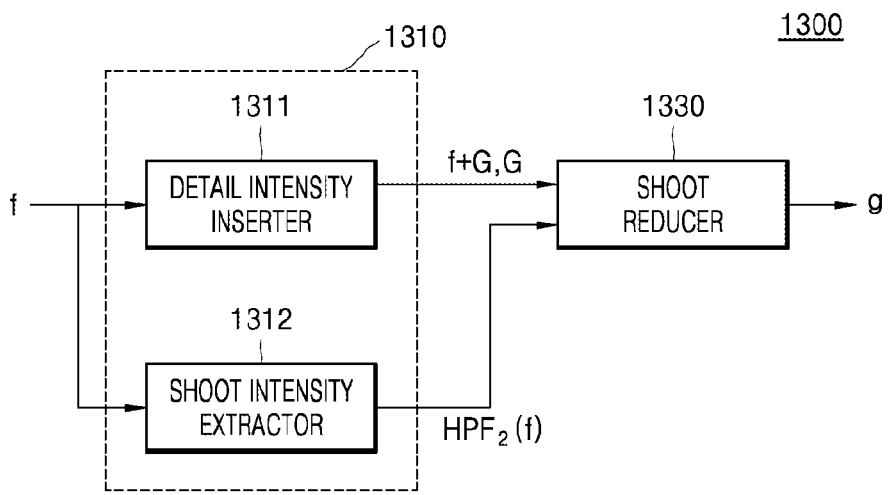

FIGS. 13 and 14 are block diagrams of an image processing apparatus 1300 for reducing a shoot generated in an image according to an embodiment.

Referring to FIG. 13, the image processing apparatus 1300 may include a shoot intensity obtainer 1310 and a shoot reducer 1330.

The shoot intensity obtainer 1310 may obtain a shoot intensity of at least one pixel of an input image. If the shoot intensity obtainer 1310 inserts a detail intensity into the pixel of the input image, the detail intensity inserted into the pixel may be obtained as the shoot intensity of the pixel. The shoot intensity obtainer 1310 may extract a shoot intensity present in an original pixel value of the pixel. In this regard, the shoot intensity of each pixel may be a high frequency component of each pixel.

The shoot reducer 1330 may obtain the shoot intensity of each pixel using the shoot intensity of the original pixel of the input image and the detail intensity inserted into the input image, and may diffuse the obtained shoot intensity to a neighboring pixel of each pixel. The shoot intensity of each pixel may be obtained by summing the shoot intensity of the original pixel of the input image and the detail intensity inserted into the input image. In this regard, if the shoot intensity of a pixel is +5, a value added to the neighboring pixel may be a value to which a weight is applied to −5. The weight may be different according to a relative location with respect to the neighboring pixel. The shoot intensity of a pixel of the input image is diffused to the neighboring pixel by the shoot reducer 1330. Therefore, the shoot generated is reduced in the input image.

Referring to FIG. 14, the image processing apparatus 1300 may include the shoot intensity obtainer 1310 and the shoot reducer 1330. The shoot intensity obtainer 1310 and the shoot reducer 1330 of FIG. 14 may correspond to the shoot intensity obtainer 1310 and the shoot reducer 1330 of FIG. 13. Thus, redundant descriptions thereof are omitted.

The shoot intensity obtainer 1310 of FIG. 14 may include a detail intensity inserter 1311 and a shoot intensity extractor 1312.

The detail intensity inserter 1311 may insert a detail intensity so as to improve detail of an input image. The detail intensity inserter 1311 may insert the detail intensity into the input image using the method of inserting the detail intensity according to an embodiment. However, exemplary embodiments are not limited thereto and the detail intensity inserter 1311 may insert the detail intensity into the input image using another method. The detail intensity inserter 1311 may transfer the input image into which the detail intensity is inserted and the detail intensity G to the shoot reducer 1330.

A shoot intensity extractor 1312 may extract the shoot intensity of an original pixel of the input image. In this regard, the shoot intensity of each pixel may be a high frequency component of each pixel. The extracted shoot intensity of each pixel may be transferred tote shoot reducer 1330.

Figure 15:
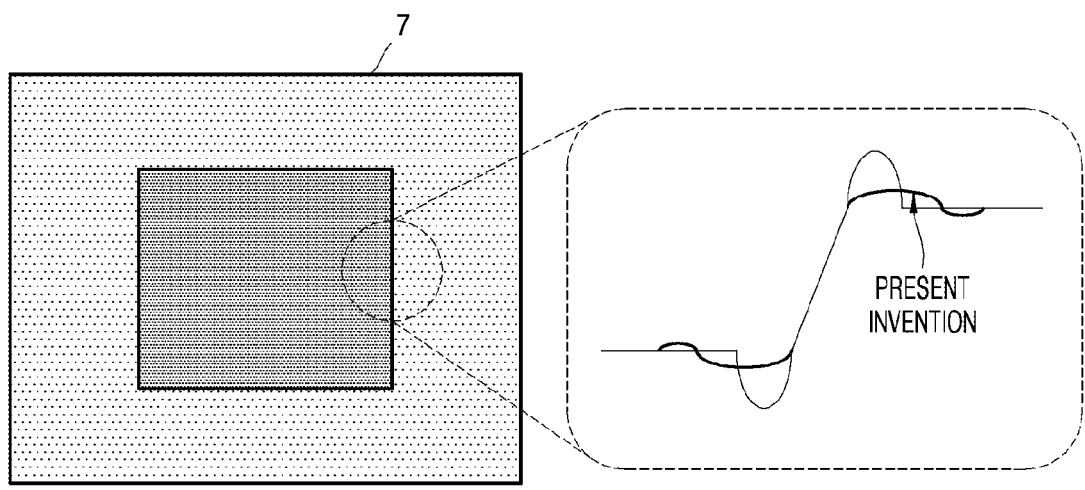
FIG. 15 is a diagram for explaining a method of reducing a shoot generated in an image according to an embodiment.

The shoot reducer 1330 may obtain the shoot intensity of each pixel using the shoot intensity of the original pixel of the input image and the detail intensity inserted into the input image, and may diffuse the obtained shoot intensity to the neighboring pixel of each pixel. FIG. 15 is a diagram for explaining a method of reducing a shoot generated in an image according to an embodiment.

Referring to FIG. 15, the shoot may be generally generated in an edge part of an input image 7, including a high frequency component, due to a rapid change of a pixel value.

A graph of FIG. 15 shows the edge part of the input image 7 at which the shoot is generated.

Referring to the graph, since the shoot is generated in the edge part and has a higher value than those of neighboring pixels, an image in which an unnatural white line is added may be displayed.

According to an embodiment, neighboring pixel values of a pixel value at which the shoot is generated are reduced. Therefore, the shoot generated in the image is reduced.

According to an embodiment, texture or detail loss of an image which occurs during image processing such as transmission, compression, enlargement, and reduction of the image may be reduced.

According to an embodiment, a clearer image may be obtained by adding noise to a high frequency region in a flat region of the image, and sharpness may be improved by inserting a signal in proportional to a frequency value in a texture region.

According to an embodiment, error diffusion is used to search for a position related to detail. Therefore a detail region is found as a uniform pattern, in comparison to a mere determination of a texture position in the flat region.

According to an embodiment, a shoot may be reduced by performing a relatively small amount of calculations without reducing detail of an image.

The exemplary embodiments may also be embodied as computer (including all devices having the function of image processing) readable codes on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, etc.

The exemplary embodiments may also disclose that any of the detail intensity insertion unit 3, the high frequency component extraction unit 5, the texture position determining unit 1010, the detail intensity determining unit 1020, the detail intensity insertion unit 1030, the error diffusion unit 1111, the quantization unit 1112, the error diffusion coefficient processing unit 1113, the high frequency component extraction unit 1221, the non-flat region determining unit 1222, the detail intensity output unit 1223, the error diffusion unit 1310, the quantization unit 1330, the detail intensity insertion unit 1311, the shoot intensity extraction unit 1312, and the shoot reduction unit 1330 may include a processor, a hardware module, or a circuit for performing their respective functions.

While exemplary embodiments has been particularly shown and described with reference to preferred embodiments thereof, it will be understood by those of ordinary skill in the art that various changes in form and details may be made therein without departing from the spirit and scope of the exemplary embodiments as defined by the appended claims. The preferred embodiments should be considered in a descriptive sense only and not for purposes of limitation. Therefore, the scope of exemplary embodiments are defined not by the detailed description, but by the appended claims, and all differences within the scope will be construed as being included in the exemplary embodiments.

What is claimed is:

1. An image processing method comprising:
   obtaining a binary value by quantizing a value obtained by summing at least one pixel value of an input image and a quantization error value of a neighboring pixel;
   determining a pixel in which a detail intensity is to be inserted according to the binary value of each pixel;
   determining the detail intensity to be inserted in the determined pixel; and
   inserting the determined detail intensity in the determined pixel,
   wherein the quantization error value of the neighboring pixel is a difference value between an original pixel value of the neighboring pixel and a pixel value quantized with respect to a predetermined constant value.

2. The image processing method of claim 1, wherein the determining the detail intensity comprises:
   extracting a high frequency component of the input image;
   determining whether the at least one pixel of the input image belongs to a non-flat region or a flat region using the extracted high frequency component; and
   determining the detail intensity to be inserted in the determined pixel of the input image according to a result of the determination.

3. The image processing method of claim 2, wherein the determining the detail intensity further comprises:
   if the at least one pixel of the input image belongs to the non-flat region, determining the detail intensity to be inserted in the at least one pixel in proportion to the extracted high frequency component.

4. The image processing method of claim 2, wherein the determining the detail intensity further comprises:
   if the at least one pixel of the input image belongs to the flat region, determining the detail intensity to be inserted in the at least one pixel as a previously set constant value or a random constant value.

5. The image processing method of claim 1, wherein the determining the detail intensity comprises:
   determining whether the determined detail intensity belongs to a previously set range; and
   if the determined detail intensity does not belong to the previously set range, determining a boundary value, that is slightly different from the determined detail intensity among boundary values of the previously set range, as the detail intensity to be inserted in the determined pixel.

6. An image processing method comprising:
   determining whether a detail intensity is inserted into a pixel of an input image;
   according to a result of the determining, obtaining a shoot intensity of the pixel based on the detail intensity inserted in the pixel and a shoot intensity of an original pixel value of the pixel; and
   diffusing the obtained shoot intensity to at least one neighboring pixel of the pixel.

7. The image processing method of claim 6, wherein the shoot intensity of the original pixel value of the pixel is determined according to a frequency value of the original pixel value of the pixel.

8. The image processing method of claim 6, wherein the diffusing the obtained shoot intensity to the at least one neighboring pixel of the pixel comprises:
   determining a weight to be applied to the shoot intensity in a direction of a position of the pixel with respect to the at least one neighboring pixel;
   applying the determined weight to the shoot intensity; and
   changing a neighboring pixel value using the shoot intensity in which the weight is applied.

9. An image processing apparatus comprising:
   a texture position determiner configured to obtain a binary value by quantizing a value obtained by summing at least one pixel value of an input image and a quantization error value of a neighboring pixel and determine a pixel into which a detail intensity is to be inserted according to the binary value of each pixel;
   a detail intensity determiner configured to determine the detail intensity to be inserted in the determined pixel; and
   a detail intensity inserter configured to insert the determined detail intensity in the determined pixel,
   wherein the quantization error value of the neighboring pixel is a difference value between an original pixel value of the neighboring pixel and a pixel value quantized with respect to a predetermined constant value.

10. The image processing apparatus of claim 9, wherein the detail intensity determiner comprises:
    a high frequency component extractor configured to extract a high frequency component of the input image;
    a non-flat region determiner configured to determine whether the at least one pixel of the input image belongs to a non-flat region or a flat region using the extracted high frequency component; and
    a detail intensity outputter configured to determine the detail intensity to be inserted in the determined pixel of the input image according to a result of the determination of the non-flat region.

11. The image processing apparatus of claim 10, wherein if the at least one pixel of the input image belongs to the non-flat region, the detail intensity outputter is configured to determine the detail intensity to be inserted in the at least one pixel in proportion to the extracted high frequency component.

12. The image processing apparatus of claim 10, wherein if the at least one pixel of the input image belongs to the flat region, the detail intensity outputter is configured to determine the detail intensity to be inserted in the at least one pixel as a previously set constant value or a random constant value.

13. The image processing apparatus of claim 10, wherein the detail intensity outputter is configured to determine whether the determined detail intensity belongs to a previously set range, and, if the determined detail intensity does not belong to the previously set range, determines a boundary value that is slightly different from the determined detail intensity among boundary values of the previously set range as the detail intensity to be inserted in the determined pixel.

14. An image processing apparatus comprising:
    a shoot intensity obtainer configured to obtain a shoot intensity of a pixel of an input image based on a detail intensity inserted in the pixel and a shoot intensity of an original pixel value of the pixel according to whether or not the detail intensity is inserted into the pixel; and
    a shoot reducer configured to diffuse the obtained shoot intensity to at least one neighboring pixel of the pixel.

15. The image processing apparatus of claim 14, wherein the shoot intensity obtainer comprises:
- a detail intensity inserter configured to insert the detail intensity in the pixel; and
- a shoot intensity extractor configured to extract the shoot intensity of the original pixel value of the pixel.

16. The image processing apparatus of claim 14, wherein the shoot reducer is configured to determine a weight to be applied to the shoot intensity in a direction of a position of the pixel with respect to the at least one neighboring pixel, applies the determined weight to the shoot intensity, and changes a neighboring pixel value using the shoot intensity in which the weight is applied.

17. A non-transitory computer readable recording medium having recorded thereon a program, the program comprises:
- obtaining a binary value by quantizing a value obtained by summing at least one pixel value of an input image and a quantization error value of a neighboring pixel;
- determining a pixel in which a detail intensity is to be inserted according to the binary value of each pixel;
- determining the detail intensity to be inserted in the determined pixel; and
- inserting the determined detail intensity in the determined pixel,
- wherein the quantization error value of the neighboring pixel is a difference value between an original pixel value of the neighboring pixel and a pixel value quantized with respect to a predetermined constant value.

18. A shoot reducing method comprising:
- obtaining a shoot intensity generated in each neighboring pixel of a pixel in an input image based on a detail intensity inserted in the each neighboring pixel and a shoot intensity of an original pixel value of the each neighboring pixel;
- determining a direction of at least one neighboring pixel with respect to the pixel;
- determining a weight to be applied to the shoot intensity generated in each neighboring pixel according to the determined direction;
- obtaining a total sum of the shoot intensity by applying the weight to the shoot intensity of the at least one neighboring pixel; and
- changing a pixel value of the pixel using the obtained total sum.

19. The shoot reducing method of claim 18, wherein the changing the pixel value of the pixel using the obtained sum further comprises adding the obtained total sum to the pixel value of the pixel.

20. The shoot reducing method of claim 18, wherein the obtaining the total sum of the shoot intensity comprises adding the weight to the shoot intensity of the at least one neighboring pixel.

* * * * *